(12) United States Patent
Mandle

(10) Patent No.: US 8,718,971 B2
(45) Date of Patent: May 6, 2014

(54) SYSTEM FOR DETERMINING THE AIRSPEED OF AN AIRCRAFT

(75) Inventor: Jacques Mandle, Saint Péray (FR)

(73) Assignee: Thales, Neuilly sur Seine (FR)

( * ) Notice: Subject to any disclaimer, the term of this patent is extended or adjusted under 35 U.S.C. 154(b) by 382 days.

(21) Appl. No.: 13/269,128

(22) Filed: Oct. 7, 2011

(65) Prior Publication Data

US 2012/0089362 A1    Apr. 12, 2012

(30) Foreign Application Priority Data

Oct. 8, 2010  (FR) ...................................... 10 03994

(51) Int. Cl.
*G01P 5/00*    (2006.01)

(52) U.S. Cl.
USPC ........................................................ 702/144

(58) Field of Classification Search
CPC ........................................................... G01P 5/26
USPC ......................................................... 702/144
See application file for complete search history.

(56) References Cited

U.S. PATENT DOCUMENTS

| | | |
|---|---|---|
| 5,648,604 A | 7/1997 | Morbieu |
| 2010/0128251 A1 | 5/2010 | Perrie et al. |
| 2012/0140237 A1 | 6/2012 | Lehureau et al. |

FOREIGN PATENT DOCUMENTS

| | | |
|---|---|---|
| EP | 0703468 A1 | 3/1996 |
| FR | 2922314 A1 | 4/2009 |
| FR | 2938924 A1 | 5/2010 |

*Primary Examiner* — Stephen Cherry
(74) *Attorney, Agent, or Firm* — Baker & Hostetler LLP

(57) ABSTRACT

A system for determining the true airspeed vector, defined by a magnitude and by a direction, of an aircraft comprising a fuselage, comprises four laser anemometers each having a single measurement path so as to measure a local component of the true airspeed and being distributed in different locations around the fuselage of the aircraft; and means for calculating the magnitude and direction of the true airspeed vector of the aircraft using the four measurements of components of the true airspeed.

8 Claims, 4 Drawing Sheets

SYSTEM FOR DETERMINING THE AIRSPEED OF AN AIRCRAFT

CROSS-REFERENCE TO RELATED APPLICATION

This application claims priority to foreign French patent application No. FR 1003994, filed on Oct. 8, 2010, the disclosure of which is incorporated by reference in its entirety.

FIELD OF THE INVENTION

The invention relates to the field of anemometer measurements onboard fixed-wing aircraft.

BACKGROUND

Onboard anemometer measurements notably aim to determine the following values located at infinity upstream: the true airspeed (or TAS), the angle of attack, the sideslip, the calibrated airspeed and the static pressure of the aircraft or the pressure altitude.

It will be recalled that:

the true airspeed V is the speed of an aircraft relative to undisturbed air;

the angle of attack is the angle α formed between the velocity vector V of the aircraft and the longitudinal axis;

the sideslip is the angle between the velocity vector V and the (vertical) plane of symmetry of the aircraft;

the static pressure (Ps) is a pressure measured for example by a static pressure probe;

the total pressure (Pt) is the pressure measured by a pitot tube, for example;

the calibrated airspeed (Vc) is the speed used to determine the stall speed of the aircraft (this is the speed that the aircraft would be moving at, relative to the ground, under standard conditions, with the same measured pressure Pt less Ps); and the pressure altitude is the altitude corresponding to the static pressure in the Standard Atmosphere Table defined by the International Civil Aviation Organisation.

These values correspond to infinity upstream of the aircraft. Infinity upstream is a distance upstream of the aircraft that is sufficiently large (for example six fuselage diameters of the aircraft) that the movement of the air induced by the movement of said aircraft does not disturb the aerodynamic field.

Current systems determine these values at infinity upstream using local clinometer or anemometer measurements. These local measurements are carried out near the fuselage and are therefore subject to the disturbances generated by the latter.

The disturbances induced by the aircraft may be calculated so as to adequately correct the local measurements. In order to establish these corrections, prior calibration needs to be carried out during test flights undertaken by the manufacturer.

Systems according to the prior art used to determine the airspeed of an aircraft comprise:

an angle-of-attack probe placed in a particular place (local angle of attack insensitive to sideslip) and measuring a local angle of attack $\alpha_{loc}$;

optionally a sideslip probe measuring a local sideslip $\beta_{loc}$;

a pitot tube measuring a total pressure Pt; and a pair of left/right static-pressure probes placed in particular places (where the average L/R (left/right) static pressure does not depend on the sideslip, and for which a pneumatic average of the L/R pressures is calculated, corrected by SSEC (static source error correction) laws, so as to determine the local static pressure Ps; and a probe for measuring an impact temperature Ti (or total air temperature TAT) which is the temperature due to kinetic heating during movement of the aircraft.

FIG. 1 illustrates a local angle of attack close to a fuselage of an aircraft. This figure shows a plane 100 tangent to a fuselage 101 (assumed to be cylindrical) of an aircraft. The aircraft has a longitudinal axis 102 and a plane of symmetry 103.

It will be recalled that t local angle of attack $\alpha_{loc}$ is the angle between, on the one hand, a velocity vector $V_{loc}$ measured locally (i.e. close to the fuselage) in the plane 100 tangent to the fuselage 101 and, on the other hand, a vector u located in the tangent plane and parallel to the longitudinal axis of the aircraft 102.

The probe measuring the local angle of attack $\alpha_{loc}$ is for example a vane (i.e. a small moveable fin) aligning to the wind direction.

Alternatively, the local angle of attack $\alpha_{loc}$ may also be determined indirectly by carrying out two measurements:

measurement of the velocity vector u located in tangent the plane 100 and parallel to the longitudinal axis of the aircraft 102; and measurement of a velocity vector v located in tangent the plane 100 and orthogonal to the velocity vector u.

The local angle of attack $\alpha_{loc}$ is then determined using these two values by applying the following formula: $\alpha_{loc} = \tan^{-1}(v/u)$.

As for the local angle of attack, it is possible to measure the sideslip directly using a vane that aligns to the wind direction.

It is also possible to determine the sideslip using the ratio of two measured components.

FIG. 2 shows an example of a device according to the prior art for determining the angle of attack and the sideslip of an aircraft using local angle-of-attack measurements.

This device comprises a first vane 201 located on one side of the fuselage 101 and a second vane 202 located on another side of the fuselage, symmetrically to the first vane about the plane of symmetry of the aircraft. The first vane 201 measures a first local angle of attack $\alpha_{locG}$ and the second vane 202 measures a second local angle of attack $\alpha_{locD}$. The angle of attack α and the sideslip β at infinity upstream of the aircraft may then be determined using the above local measurements by applying the following relationships:

$$\alpha = f((\alpha_{locD} + \alpha_{locG})/2)$$

$$\beta = g((\alpha_{locD} - \alpha_{locG})/2)$$

where f and g are functions that depend on the aerodynamic properties of the aircraft and that take into account corrections related to the disturbances mentioned above.

FIG. 3 shows the way in which airspeed parameters are determined using the local measurements taken.

The calibrated airspeed Vc is derived from the difference ΔP between the total pressure Pt and the local static pressure Ps.

The Mach number M is determined from the ratio of, on the one hand, the difference ΔP between the total pressure Pt and the local static pressure Ps to, on the other hand, the local static pressure Ps.

The static temperature T is determined from the impact temperature Ti and the Mach number M.

The Mach number M and the static temperature T then make it possible to calculate the magnitude of the true airspeed vector V.

The local static pressure Ps and the static temperature T then make it possible to calculate the density e of the air.

The magnitude of the true airspeed vector, the angle of attack and the sideslip angle at infinity upstream of the aircraft allows the true airspeed vector of the aircraft to be completely defined.

These systems notably have the drawback of requiring measurement instruments, for example vanes, which are fragile, because they are light, and particularly sensitive to icing.

These systems are furthermore difficult to install because the measurement instruments must moreover be placed at specific points on the fuselage of the aircraft so as to minimize measurement errors related to disturbances.

A system for measuring the true airspeed of an aircraft using a laser anemometer focused far from the fuselage (at least 100 m away) and carrying out at least three measurements at three different points in space is known already. However, such a system has the drawback of requiring a powerful laser with a wide aperture. In addition, determining three appropriate measurement points can be difficult.

SUMMARY OF THE INVENTION

The invention notably aims to alleviate the aforementioned problems by providing a system for determining the airspeed of an aircraft more reliably, the system also being easier to install on the fuselage of the aircraft.

The invention thus makes the measurement of airspeed parameters easier.

For this purpose, the subject of the invention is a system for determining the true airspeed vector, defined by a magnitude and by a direction, of an aircraft comprising a fuselage, said system being characterized in that it comprises;

four laser anemometers each having a single measurement path so as to measure a local component of the true airspeed and being distributed in different locations around the fuselage of the aircraft; and means for calculating the magnitude and direction of the true airspeed vector of the aircraft using the four measurements of components of the true airspeed.

The solution of the invention uses laser anemometers capable of taking measurements along a targeted axis (by virtue of a Doppler-effect measurement) so as to determine the angle of attack and sideslip.

Laser anemometers have safety advantages (no risk of icing, dissimilarity to a conventional system, reliability and insensitivity to aerosols).

The invention makes it possible to avoid the use of fragile and protruding angle-of-attack probes and pitot tubes and probes. These devices, which are particularly sensitive to icing, are replaced by more resistant laser anemometers that do not protrude.

Advantageously, the first and the second of the four laser anemometers are located substantially in the horizontal plane of the aircraft and symmetrically relative to the longitudinal axis of the aircraft.

Advantageously, the third and the fourth of the four laser anemometers are located substantially in the vertical plane of the aircraft and symmetrically relative to the longitudinal axis of the aircraft.

Advantageously, the axis along which the measurement is carried out is an axis lying in a plane parallel to the plane tangent to the fuselage, said measurement axis making an angle D to the axis lying in a plane parallel to the plane tangent to the fuselage and parallel to the longitudinal axis of the fuselage.

Advantageously, the angle D between the measurement axis and the axis lying in a plane parallel to the plane tangent to the fuselage and parallel to the longitudinal axis of the fuselage is substantially equal to 45 degrees.

Advantageously, the laser anemometers are configured to carry out local measurements.

Advantageously, the laser anemometers have a focal distance smaller than one meter.

Advantageously, the system according to the invention comprises a fifth and a sixth laser anemometer distributed around the fuselage.

BRIEF DESCRIPTION OF THE DRAWINGS

Advantageously, the laser anemometers use fibre lasers, each of the laser anemometers being connected, via an optical fibre, to one and the same power supply.

The invention will be better understood and other advantages will become clear on reading the detailed description given by way of non-limiting example and using the figures among which.

DETAILED DESCRIPTION

The invention makes it possible to completely characterize the velocity vector of the aircraft, i.e. its magnitude and its direction (using the angle of attack and the sideslip) on the basis of at least four measurements of local speed components.

Figure 4:
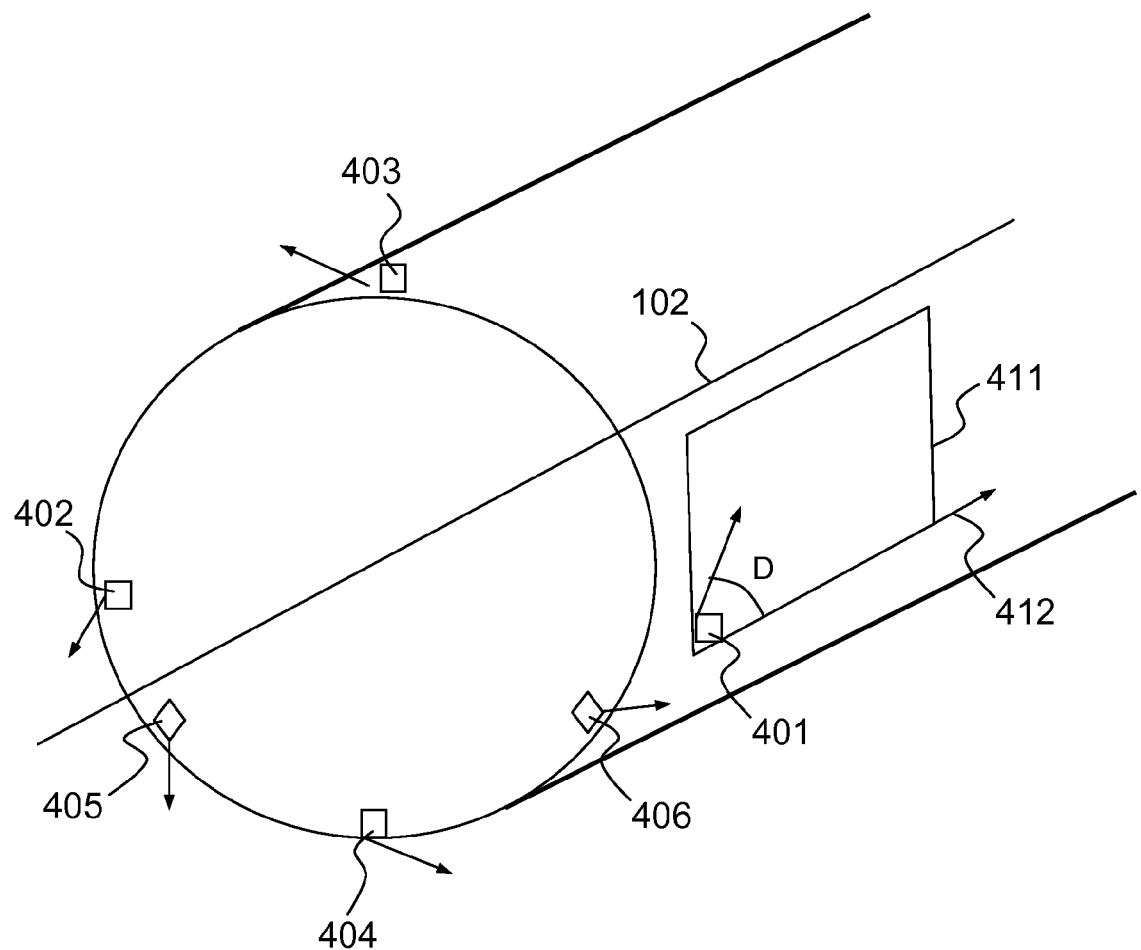
FIG. 4 shows an exemplary embodiment of the measurement system according to the invention.

FIG. 4 shows an exemplary embodiment of the measurement system according to the invention.

The system comprises four laser anemometers 401, 402, 403, 404 distributed around the fuselage 101 of the aircraft, measuring a component of the true airspeed and being positioned in various locations around the fuselage 101 of the aircraft.

The system also comprises means for calculating the true airspeed of the aircraft using the four measurements of local components of the true airspeed.

The anemometers may be placed in separate locations anywhere on the fuselage. There are however advantageous positions that make the calculations performed by these measurements easier.

Advantageously, the first 401 and the second 402 of the four anemometers are located substantially in the horizontal plane of the aircraft and symmetrically relative to the longitudinal axis 102 of the aircraft. The third 403 and the fourth 404 of the four anemometers are located substantially in the vertical plane of the aircraft and symmetrically relative to the longitudinal axis 102 of the aircraft.

This particular embodiment makes it easier to calculate the velocity vector using the measurements.

The anemometers are configured to take local measurements. The lasers are focused near the fuselage, at a distance of less than 1 meter, for example between 10 and 50 cm for a fuselage having a diameter of between 4 meters and 8 meters. This enables the use of low-power lasers that are less expensive and less bulky than lasers that can be focused further away.

Each of the laser anemometers has only a single measurement path, i.e. it takes velocity measurements only along a single axis. Thus, at a given moment, a set of four local components of the airspeed is obtained, which components are used to determine the magnitude of the true airspeed vector, the angle of attack and the sideslip.

The axis along which the measurement is taken is an axis located in a plane 411 lying substantially parallel to the plane tangent to the fuselage. This axis makes an angle D to the axis 412 lying in the plane 411 substantially parallel to the plane tangent to the fuselage and parallel to the longitudinal axis of the fuselage.

The value of the angle D is substantially higher than 0, so as to not lie along the direction of movement of the aeroplane.

D may for example be about 45°.

What is important is to take a measurement a few tens of centimeters from the emitter (the term "emitter" being understood to mean the lens from which the laser beam is emitted), in an almost tangential plane (located a few centimeters from the sidewall so as to be located outside the boundary layer that develops on the fuselage of the aircraft). This is valid for fuselage diameters of with transport planes, i.e. diameters of about 2 to 8 m.

Advantageously, the measurement device furthermore comprises a fifth 405 and a sixth 406 laser anemometer distributed around the fuselage.

In the example, the fifth anemometer 405 is located midway between the third and fourth anemometers and the sixth anemometer 406 is located midway between the fourth and first anemometers.

Since the anemometers are then located beneath the fuselage of the aircraft they are therefore protected from had weather.

Alternatively, the fifth anemometer 405 is located midway between the third and second anemometers and the sixth anemometer 406 is located midway between the second and first anemometers.

Placing the other anemometers at midway points is optional but it makes the calculations carried out on the measurements easier.

This redundant configuration has the advantage of making it possible to detect when one of the laser anemometers stops working.

Figure 1:
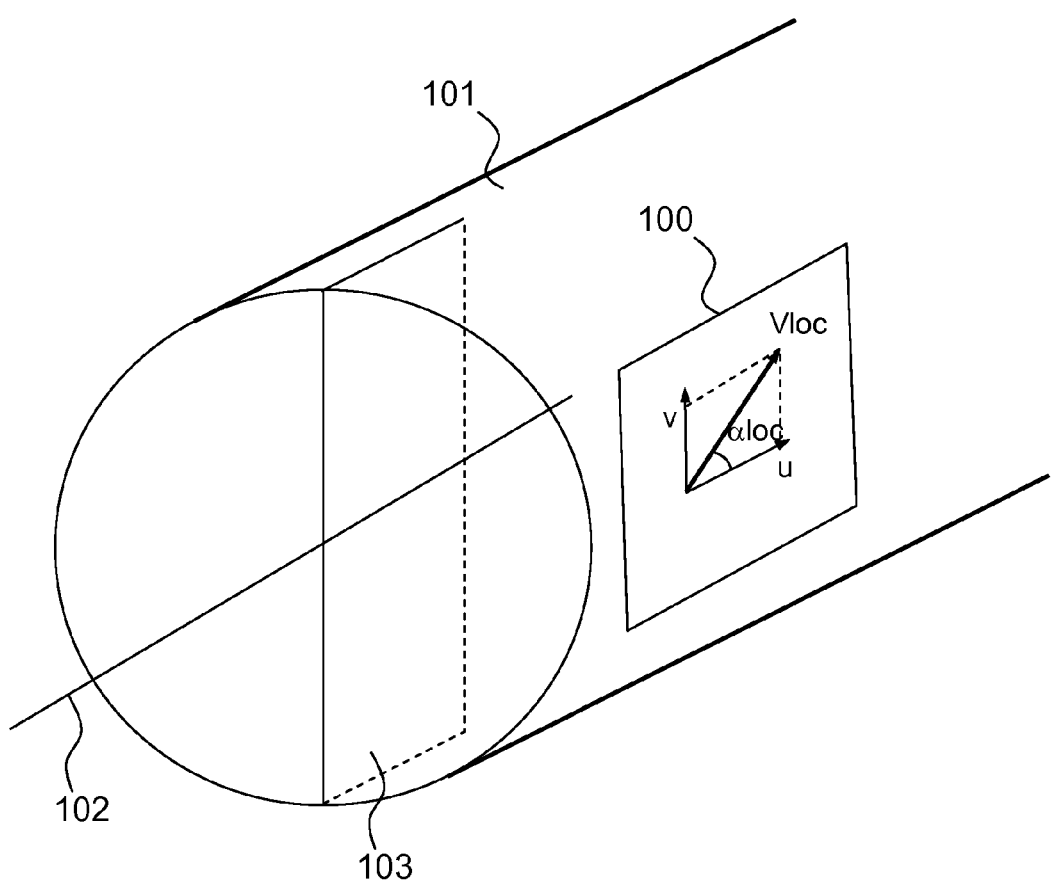
FIG. 1, introduced above, illustrates a local angle of attack close to the fuselage of an aircraft.
Figure 2:
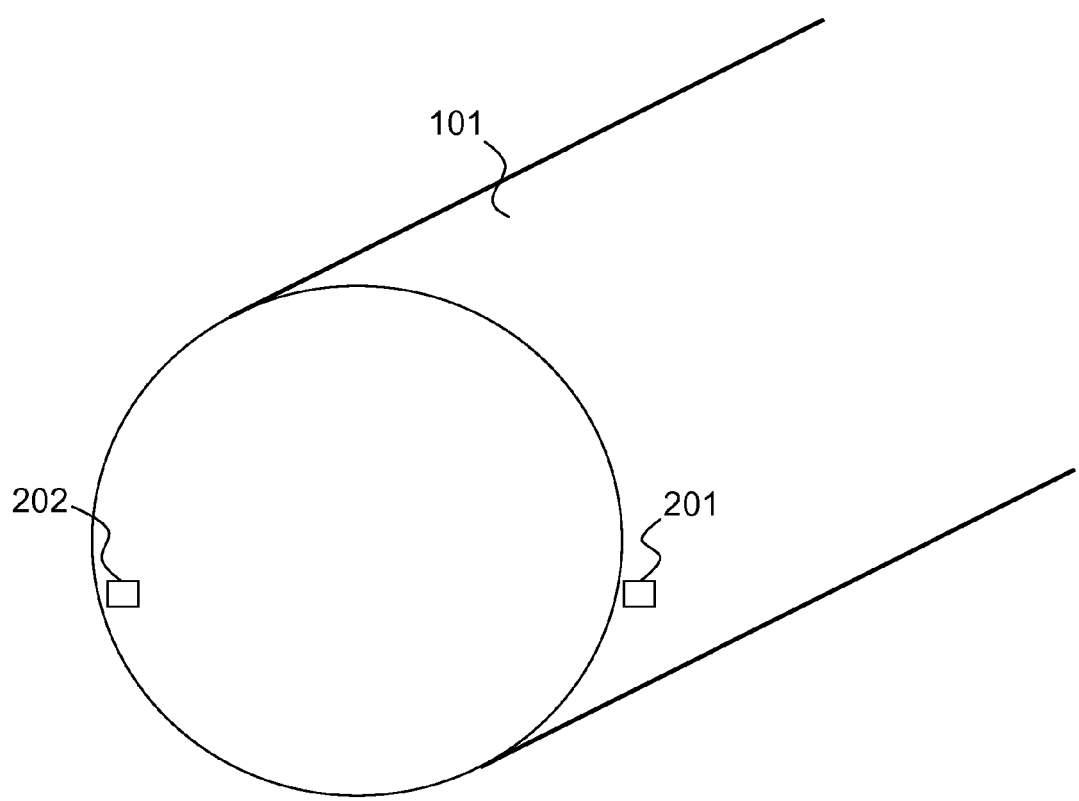
FIG. 2, introduced above, shows an example of a device according to the prior art for determining the angle of attack and the sideslip of an aircraft using local angle-of-attack and sideslip measurements.
Figure 3:
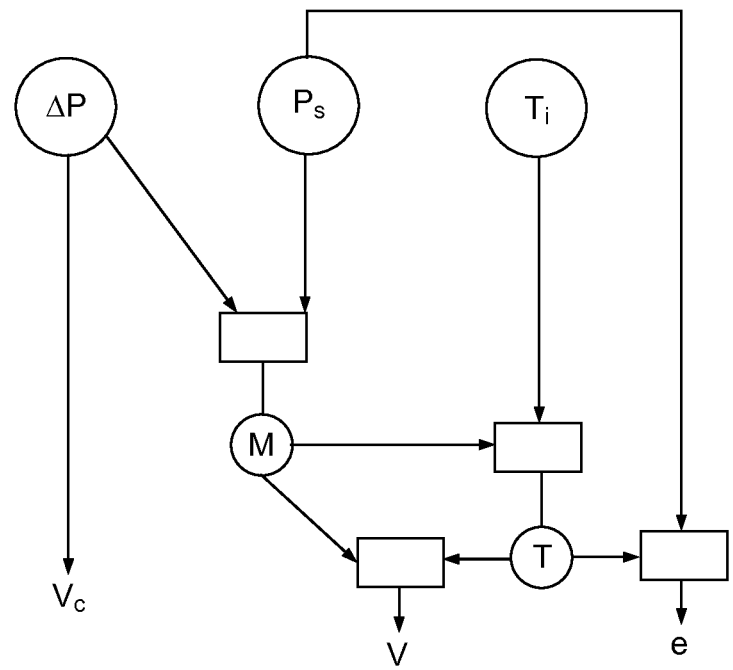
FIG. 3, introduced above, shows the way in which the airspeed parameters are determined using the local measurements taken.
Figure 5:
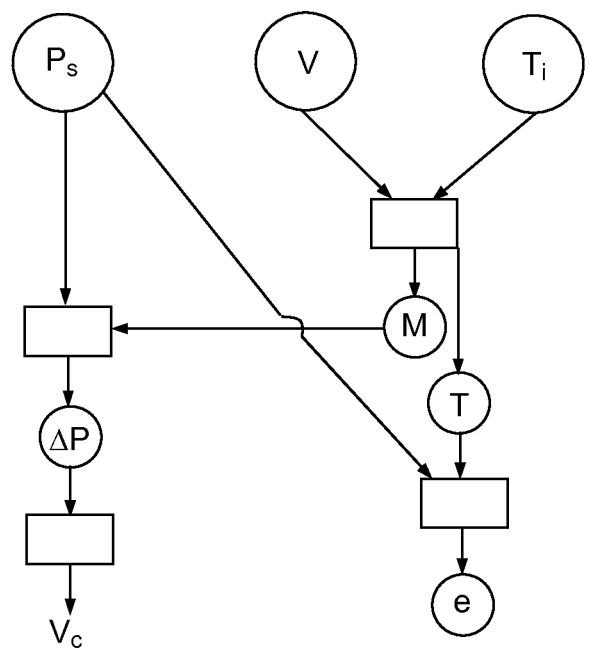
FIG. 5 shows the way in which the airspeed parameters are determined using the local measurements taken.

FIG. 5 shows the way in which the airspeed parameters are determined using the local measurements taken.

The true airspeed vector V at infinity upstream is calculated using the true airspeed components measured by the laser anemometers. However, these measurements are highly disturbed by the presence of the fuselage. A correction is therefore necessary.

Prior in-flight calibration (in the development phase of the aircraft) is therefore necessary after a first theoretical estimation using fluid-mechanics calculations on the portion of the fuselage considered.

It is important to explore the entire flight envelope of the aircraft, in angle of attack, sideslip, speed and altitude, and to record the various measurements, with a reference speed that is defined, for example by a laser anemometer focused to an average distance (about one hundred meters), and a static pressure reference which may conventionally be a towed cone (making it possible to avoid the disturbances due to the fuselage) or an indirect method based on radionavigation altitude measurement (GPS for example), the wind being estimated via the release of weather balloons.

It is therefore possible then to register all of the parameters (4 or 6 local speeds, static pressures, temperature) as a function of the reference parameters (angle of attack, sideslip, Mach number, calibrated airspeed, and pressure altitude) and thus obtain a look-up table that makes it possible to deliver the calibration coefficients for the anemometer system.

The means for calculating the true airspeed of the aircraft employ such a table to establish the true airspeed using the four measurements of local components of the true airspeed.

At every point explored in the flight envelope (altitude, Mach number, angle of attack and sideslip), the local measurements and the reference measurement (i.e. the true airspeed vector defined by its magnitude, an angle of attack and a sideslip angle) are recorded. Each local measurement Ui, delivered by a laser anemometer, depends on the magnitude of the velocity V at infinity upstream, on the angle of attack and on the sideslip.

Next, using these measurements, curves of local measurements Ui are determined, there being functions, for example, of an angle of attack and for constant speed and constant sideslip.

The expected values of the airspeed vector (magnitude and angle of attack and sideslip) are then derived from the four sets of curves Ui. Strictly speaking there is no correction, but instead the local measurements and the airspeed vector fit a model.

The addition of optional values makes it possible either to remove uncertainty if the aforementioned curves do not allow a single solution to be found, or to increase the reliability of the data via detection of erroneous measurements.

The dynamic pressure $\Delta P$ is derived directly from the difference between the measured static pressure Ps and the measured total pressure Pt.

The dynamic pressure then makes it possible to calculate the calibrated airspeed Vc.

The true airspeed V at infinity upstream and the impact temperature make it possible to determine the Mach number M and the static temperature T.

As above, the density e of the air is established using the local static pressure Ps and the static temperature T.

According to a preferred embodiment of the invention, the laser anemometers use fibre lasers. A fibre-laser anemometer then uses a remote power supply to which it is connected via an optical fibre. It is then possible to use a plurality of laser anemometers connected to the same power supply.

Thus, each of the laser anemometers is connected, via an optical fibre, to one and the same power supply.

This embodiment has the advantage of being easier to implement and of being more economical.

The invention claimed is:

1. A system for determining the true airspeed vector, defined by a magnitude and by a direction, of an aircraft comprising a fuselage, comprising:

four laser anemometers each having a single measurement path so as to measure a local component of the true airspeed and being distributed in different locations around the fuselage of the aircraft, said laser anemometers being configured to carry out local measurements, the local measurements being disturbed by the presence of the fuselage; and means for calculating the magnitude and direction of the true airspeed vector of the aircraft using the four measurements of components of the true airspeed, said means employing a look-up table allowing the local measurements to be correlated with the airspeed vector and taking into account the disturbances due to the presence of the fuselage.

2. A system according to claim 1, in which the first and the second of the four laser anemometers are located substantially in the horizontal plane of the aircraft and symmetrically relative to the longitudinal axis of the aircraft.

3. A system according to claim 1, in which the third and the fourth of the four laser anemometers are located substantially in the vertical plane of the aircraft and symmetrically relative to the longitudinal axis of the aircraft.

4. A system according to claim 1, in which the axis along which the measurement is carried out is an axis lying in a plan parallel to the plane tangent to the fuselage, said measurement axis making an angle D to the axis lying in a plane parallel to the plane tangent to the fuselage and parallel to the longitudinal axis of the fuselage.

5. A system according to claim 4, in which the angle D between the measurement axis and the axis lying in a plane parallel to the plane tangent to the fuselage and parallel to the longitudinal axis of the fuselage is substantially equal to 45 degrees.

6. A system according to claim 1, in which the laser anemometers have a focal distance smaller than one meter.

7. A system according to claim 1, furthermore comprising a fifth and a sixth laser anemometer distributed around the fuselage.

8. A system according to claim 1, in which the laser anemometers use fibre lasers, each of the laser anemometers being connected, via an optical fibre, to one and the same power supply.

* * * * *